United States Patent
Oh et al.

(10) Patent No.: US 9,744,830 B2
(45) Date of Patent: Aug. 29, 2017

(54) HEATING PANEL FOR VEHICLE USING FAR-INFRARED RADIATION

(71) Applicant: HYUNDAI MOTOR COMPANY, Seoul (KR)

(72) Inventors: Man Ju Oh, Yongin-si (KR); Jae Woo Park, Ansan-si (KR); Jae Woong Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 1 day.

(21) Appl. No.: 14/685,362

(22) Filed: Apr. 13, 2015

(65) Prior Publication Data
US 2016/0167482 A1 Jun. 16, 2016

(30) Foreign Application Priority Data
Dec. 10, 2014 (KR) .......................... 10-2014-0177231

(51) Int. Cl.
*H05B 1/02* (2006.01)
*B60H 1/22* (2006.01)

(52) U.S. Cl.
CPC ... *B60H 1/2225* (2013.01); *B60H 2001/2293* (2013.01)

(58) Field of Classification Search
CPC .......... B60H 1/2225; B60H 2001/2293; H05B 1/0236; H05B 1/0238; H05B 3/26; H05B 3/0042; H05B 3/145
USPC ........ 219/202, 213, 531, 542, 543, 544, 546
See application file for complete search history.

(56) References Cited

U.S. PATENT DOCUMENTS

| 3,309,500 A * | 3/1967 | Reynolds ................ F24C 7/043 |
| | | 219/218 |
| 3,961,157 A * | 6/1976 | Miller .................... F24C 7/062 |
| | | 219/213 |
| 6,611,659 B2 * | 8/2003 | Meisiek .................... B64C 1/18 |
| | | 219/213 |
| 2016/0059670 A1 * | 3/2016 | Satzger ................ B60H 1/2215 |
| | | 219/202 |

FOREIGN PATENT DOCUMENTS

| JP | 08-042867 A | 2/1996 |
| JP | 2003-260718 A | 9/2003 |
| JP | 2010-091185 A | 4/2010 |
| KR | 10-2010-0055001 A | 5/2010 |
| KR | 10-2011-0001462 A | 1/2011 |
| KR | 10-2012-0039370 A | 4/2012 |
| KR | 10-2014-0105640 A | 9/2014 |

OTHER PUBLICATIONS

Korean Office Action issued in Korean Application No. 10-2014-0177231 dated Dec. 10, 2015.

* cited by examiner

*Primary Examiner* — Mark Paschall
(74) *Attorney, Agent, or Firm* — McDermott Will & Emery LLP

(57) ABSTRACT

A heating panel for a vehicle includes a plate-shaped heating layer and a heat insulation layer attached to the heating layer. The heating panel is spaced apart from an occupant in an interior space of the vehicle and positioned to face the occupant. The heat insulation layer is directed toward the panel in the interior space and the heating layer is directed toward the occupant.

14 Claims, 5 Drawing Sheets

| HEATING SURFACE | RESISTANCE (Ω) | OVERALL RESISTANCE (Ω) | POWER CONSUMPTION (W) | SIZE (mm) | VOLTAGE (V) |
|---|---|---|---|---|---|
| A | 4.19 | 2.10 | 80.5 | 410* 195 | 13 |
| B | 4.20 | | | | |

HEATING PANEL FOR VEHICLE USING FAR-INFRARED RADIATION

CROSS-REFERENCE(S) TO RELATED APPLICATIONS

The present application claims priority to Korean Patent Application No. 10-2014-0177231, filed on Dec. 10, 2014, the entire consent of which is incorporated herein for all purposes by this reference.

TECHNICAL FIELD

The present disclosure relates to a heating panel for a vehicle, which supplies heating to occupants through far-infrared radiators.

BACKGROUND

A vehicle has a heating system using convection heat transfer using wind (forced air) for heating an interior of the vehicle. In addition, hot wires or the like is provided in a seat or the like using contact heat transfer.

However, the convection heat transfer method is vulnerable to noise, vibration, and harshness (NVH) due to use of a blower. In the contact heat transfer method, a user feels warm the only when the user comes into direct contact with the seat, but the user may only receive heat partially.

That is, partial portions of the user such as hip and back direct receive the heat from the seat, but the heat may not transfer to other portions such as legs and one's face may not be heated enough even though a heating function of the seat is activated in a severe cold winter. For this reason, the heating system using convection must be operated together in the contact heat transfer method.

The heating system using convection generates noise, cold wind is introduced into the interior of the vehicle due to traveling wind and the like, and the body portions which are dislocated from a ventilation direction of hot air may not be heated.

As such, an interior panel or the like which is in direct contact with outside is not heated even though the conventional heating system and hot-wire heater are operated. Thus, the legs or the like located near the interior panel may be cold in spite of the operation of heating.

The matters described as the related art have been provided only for assisting the understanding for the background of the present disclosure and should not be considered as corresponding to the related art already known to those skilled in the art.

SUMMARY

An embodiment of the present inventive concept is directed to a heating panel for a vehicle, which is provided in a vehicle interior to supply heating to occupants through far-infrared radiation.

Other objects and advantages of the present disclosure can be understood by the following description, and become apparent with reference to the embodiments. Also, it is obvious to those skilled in the art to which the present disclosure pertains that the objects and advantages of the present inventive concept ears be realized by the means as claimed and combinations thereof.

In accordance with an embodiment of the present inventive concept, a heating panel for a vehicle includes a heating layer having a plate shape and a heat insulation layer attached to the heating layer. The heating panel is spaced apart from an occupant in an interior space of the vehicle to face occupants in which the heat insulation layer is directed toward the panel in the interior space and the heating layer is directed toward the occupant.

A reflective plate may be interposed between the heating layer and the heat insulation layer.

Front and rear insulation layers may be attached on front and rear surfaces of the heating layer, respectively, a reflective plate may be attached on a rear surface of the rear insulation layer, and the heat insulation layer may be attached ort a rear surface of the reflective plate.

The reflective plate may be an aluminum panel having a smooth surface and forwardly reflects far-infrared rays emitted from the heating layer.

A radiation cover may be disposed in from of the front insulation layer.

The radiation cover may be made of fiber or leather.

The radiation cover may be in black.

The radiation cover may be spaced apart from the front insulation layer by a certain distance and have a net shape, so that an occupant body is indirect contact with the front insulation layer when the occupant presses the radiation cover.

The heating layer may be formed of a carbon-nano complex.

An electrode may be interposed between the heating layer and the heat insulation layer. The electrode may comprise a plurality of anode lines and cathode fines traversing the heating layer in which the anode lines and the cathode lines are adjacent to and spaced apart from each other.

The heating panel may be mounted to a surface of a panel beneath a steering handle or a surface of a front glove compartment cover panel at a passenger seat in the inferior space of the vehicle, so that the heating layer is spaced apart from and directed toward a knee of a front occupant.

The heating panel may be mounted to a rear surface of a seat hack of a vehicle seat in the interior space of the vehicle, so that the heating layer is spaced apart from and directed toward a knee of a rear occupant.

The heat insulation layer may have a thickness equal to or more than 0.5 times an entire thickness of the heating panel.

The heating layer may be controlled in a temperature range of 50 to 100° C.

DESCRIPTION OF SPECIFIC EMBODIMENTS

Figure 1:
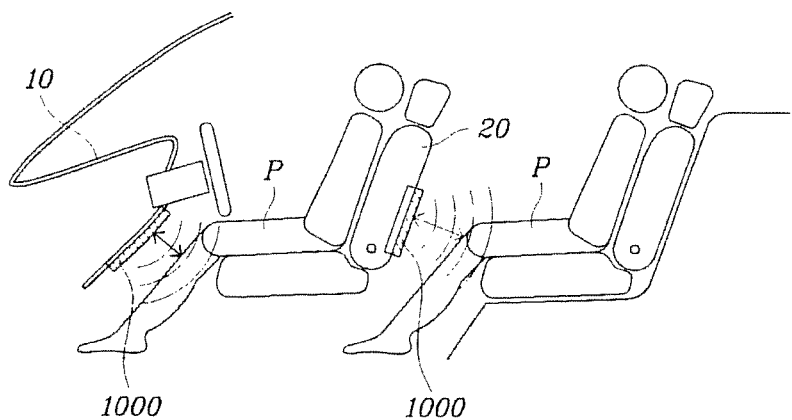
FIGS. 1 and 2 are views illustrating an installation state of a heating panel for a vehicle according to an embodiment of the present inventive concept.

An exemplary embodiment of the present inventive concept will be described below in more detail with reference to the accompanying drawings. The present disclosure may, however, be embodied in different forms and should not be construed as limited to the embodiment set forth herein. Rather, the embodiment is provided so that this disclosure will be thorough and complete, and will fully convey the scope of the present inventive concept to those skilled in the art. Throughout the disclosure, like reference numerals refer to like parts throughout the various figures and embodiments of the present inventive concept.

Figure 2:
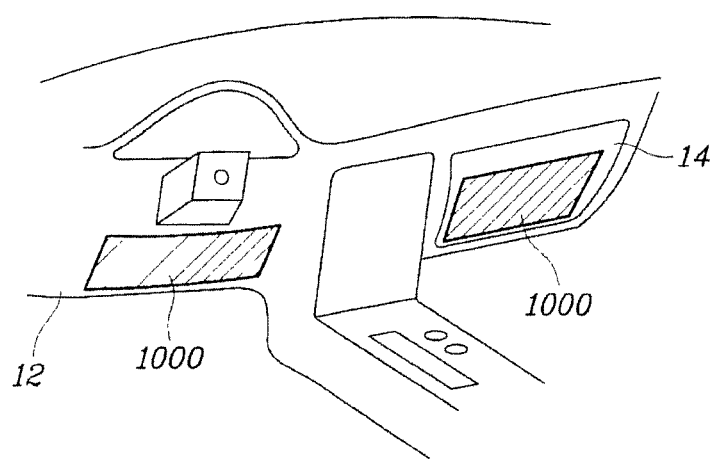
Figure 3:
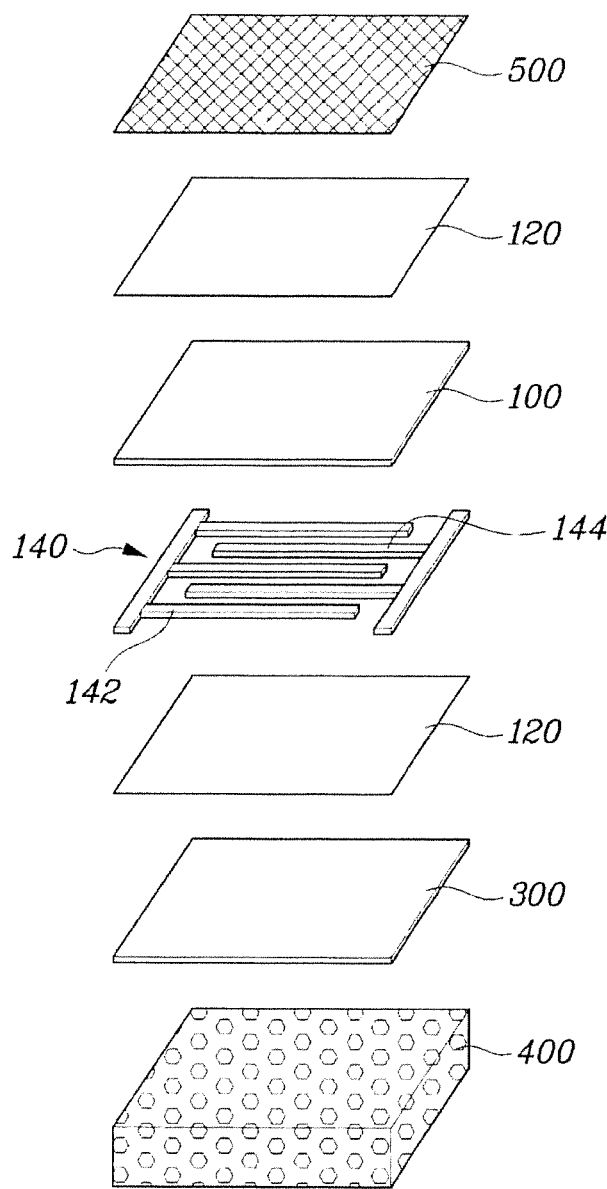
FIG. 3 is art exploded perspective view illustrating the heating panel for a vehicle according to the embodiment of the present inventive concept.
Figure 4:
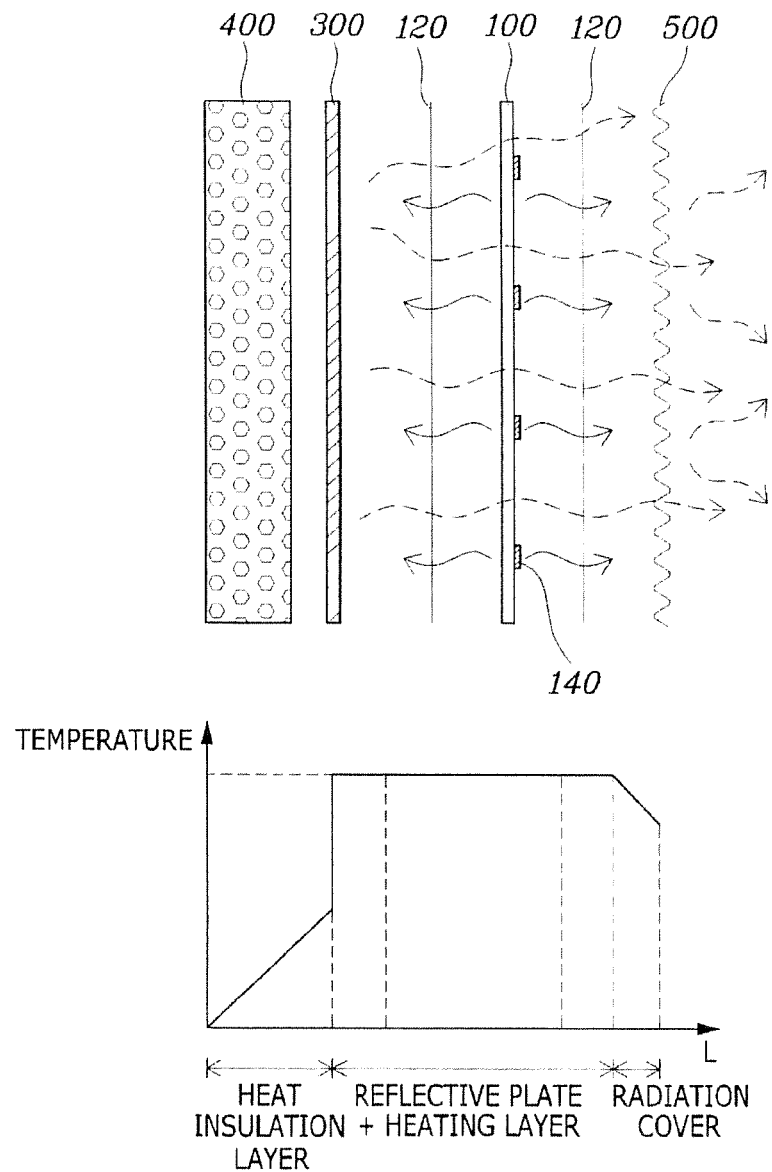
FIG. 4 is a view illustrating a change in temperature of the heating panel for a vehicle according to the embodiment of the present inventive concept.
Figure 5:
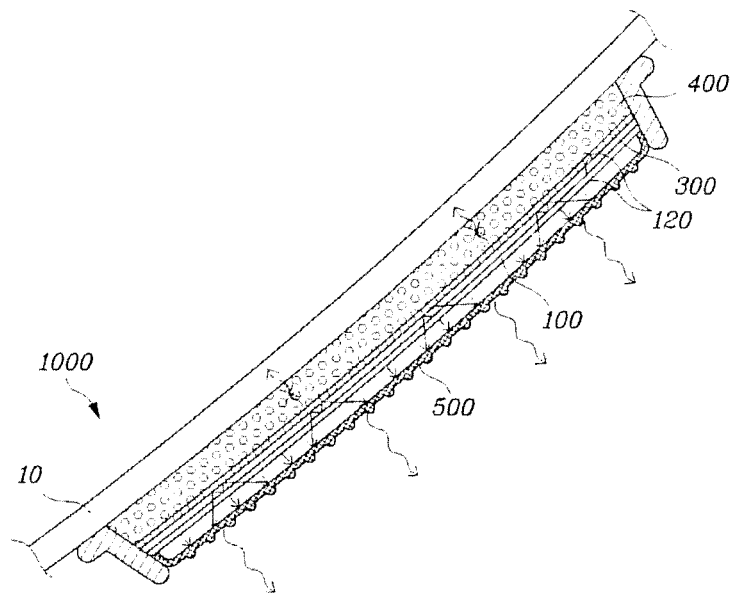
FIG. 5 is a cross-sectional view illustrating the heating panel for a vehicle according to the embodiment of the present inventive concept.
Figure 6:
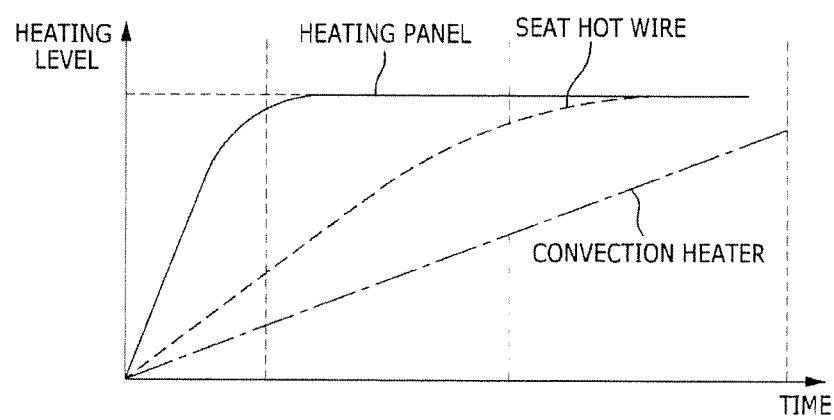
FIG. 6 is a graph illustrating an effect of the heating panel for a vehicle according to the embodiment of the present inventive concept.
Figure 7:
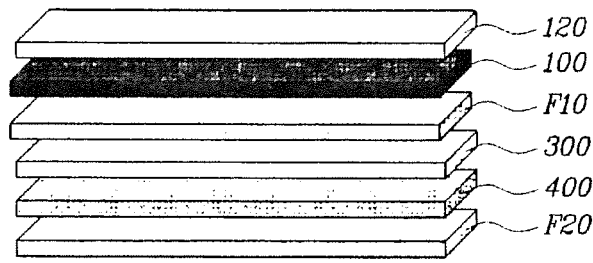
FIGS. 7 and 8 are views related to a test of the heating panel for a vehicle according to the embodiment of the present inventive concept.
Figure 8:
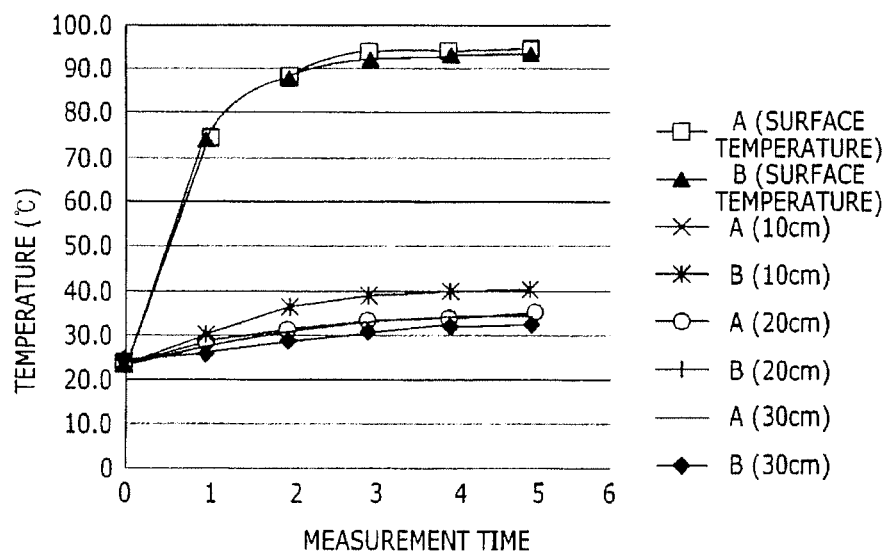

FIGS. 1 and 2 are views illustrating an installation state of a heating panel for a vehicle according to an embodiment of the present inventive concept. FIG. 3 is an exploded perspective view illustrating the heating panel for a vehicle according to the embodiment of the present inventive concept. FIG. 4 is a view illustrating a change in temperature of the heating panel for a vehicle according to the embodiment of the present inventive concept. FIG. 5 is a cross-sectional view illustrating the heating panel for a vehicle according to the embodiment of the present inventive concept. FIG. 6 is a graph illustrating an effect of the heating panel for a vehicle according to the embodiment of the present inventive concept. FIGS. 7 and 8 are views related to a test of the heating panel for a vehicle according to the embodiment of the present inventive concept.

A heating panel 1000 for a vehicle according to an embodiment of the present inventive concept includes a plate-shaped heating layer 100 and a heat insulation layer 400 attached to the heating layer 100. The heating panel 1000 is installed to a panel 10 provided in an interior space of a vehicle so as to face an occupant P at a point which is spaced apart from the occupant P. The heating panel 1000 installed to the panel 10 in the interior space may be installed such that the heat insulation layer 400 is directed toward the panel 10 in the interior space and the heating layer 100 is directed toward the occupant P.

FIGS. 1 and 2 are views illustrating an installation state of the heating panel for a vehicle according to the embodiment of the present inventive concept. As shown in the drawings, the heating panel 1000 may be installed on a surface of a panel 12 beneath a steering handle or a surface of a front glove compartment cover panel 14 at a passenger seat in the panel 10 in the interior space of the vehicle. Thus, the heating layer 100 may be directed toward a knee of a front occupant P at a point spaced apart from the knee of the front occupant P.

In addition, the heating panel 1000 may be installed on a rear surface of a seat back 20 of a vehicle seat in the panel 10 in the interior space of the vehicle such dust the heating layer 100 is directed toward a knee of a rear occupant P at a point which is spaced apart from the knee of the rear occupant P.

Through such installation positions of the heating panel 1000, legs of the occupants P in a dead region of heating can be warmly heated. The heating panel 1000 may be made of a flexible material and have a foldable structure so as to be easily matched with bent panels in the vehicle interior.

Referring to FIG. 3 is an exploded perspective view illustrating the heating panel for a vehicle according to the embodiment of the present inventive concept. FIG. 4 is a view illustrating a change in temperature of the heating panel for a vehicle according to the embodiment of the present invention. FIG. 5 is a cross-sectional view illustrating the heating panel for a vehicle according to the embodiment of the present inventive concept. The heating panel of the present disclosure includes the plate-shaped heating layer and the heat insulation layer attached to the heating layer.

Specifically, a reflective plate 300 may be interposed between the heating layer 100 and the heat insulation layer 400, and reflects far-infrared rays in the rear such that the far-infrared rays move only forward. The reflective plate 300 may be an aluminum panel having a smooth surface so as to forwardly reflect far-infrared rays emitted front the heating layer 100.

The heating panel 1000 is installed to the panel 10 provided in the interior space of the vehicle so as to face the occupant P at the point which is spaced apart from the occupant P. The heating panel 1000 may be installed to the panel 10 in the interior space such that the heat insulation layer 400 is directed toward the panel 10 in the interior space and the heating layer 100 is directed toward the occupant P.

Front and rear insulation layers 120 may be attached on front and rear surfaces of the heating layer 100, respectively. The reflective plate 300 may be attached on a rear surface of the rear insulation layer 120 and the heat insulation layer 400 may be attached on a rear surface of the reflective plate 300.

A radiation cover 500 may be attached in front of the front insulation layer 120. The radiation cover 500 may be made of fiber or leather so as to prevent direct contact with the body of the occupant P and properly radiate far-infrared rays. The radiation cover 500 may be formed in black so as to effectively radiate the far-infrared rays.

In particularly, the radiation cover 500 may be spaced apart from the front insulation layer 120 by a certain distance and have a net shape, so that the occupant body does not come into direct contact with the front insulation layer 120 when the occupant P presses the radiation cover 500. Consequently, safety may be increased, and each mesh of the radiation cover 500 may have a smaller size than a finger thickness, such that a human finger does not pass through the mesh.

In addition, an electrode 140 is interposed between the heating layer 100 and the heat insulation layer 400. The electrode 140 may be configured of a plurality of anode lines 142 and cathode lines 144 traversing the heating layer 100 and be arranged such that the anode lines 142 and the cathode lines 144 are adjacent to each other while not coming into contact with each other. In addition, the heating layer 100 may also be formed of a carbon-nano complex.

That is, the heating layer 100 is formed in a thin plate through powder such as carbon nanotube (CNT), thereby having a minimum heat capacity and an enlarged heat transfer area. In addition, the heating layer 100 may have a compact configuration due to a minimum thickness and give fluidity so as to be applied to various surfaces. The electrode 140 is coupled to the thin heating layer 100 formed through powder and the heating layer 100 as a carbon-nano complex emits heat while current flows in the heating layer 100 through cathodes and anodes. Since the electrode 140 is configured of the plurality of anode lines 142 and cathode lines 144 and is arranged such that the anode lines 142 and the cathode lines 144 are adjacent to each other while not coming into contact with each other, an entire area of the heating layer 100 may be effectively used.

The heat insulation layer 400 may have a thickness equal to or greater than 0.5 times an entire thickness of the heating panel 1000. That is, a heat capacity may further increase by significantly increasing the thickness of the heat insulation layer 400, thereby enabling heat to be maximally radiated toward the occupant P without transfer of the heat in a rearward direction.

In addition, the heating layer 100 may be controlled in a temperature range of 50 to 100° C. That is, the highest temperature of the heating layer 100 may be controlled through adjustment of a temperature adjuster (not shown) by the occupant P. Consequently, the heating layer 100 may be operated in a temperature range equal to or less than at least 100° C. so as to be safely operated and sufficiently give heating.

FIG. 4 is a view illustrating a change in temperature of the heating panel for a vehicle according to the embodiment of the present inventive concept. As shown in the drawing, it may be possible to prevent heat from being dissipated rearward by the reflective plate.

FIG. 6 is a graph illustrating an effect of the heating panel for a vehicle according so the embodiment of the present inventive concept. The heating panel of the present disclosure may provide heating to the occupants for the shortest time, thereby having excellent rapid action compared to an existing convection type heating system or conduction type seat heater.

FIGS. 7 and 8 are views related to a test of the heating panel for a vehicle according to the embodiment of the present inventive concept. The heating panel is actually manufactured as shown in FIG. 7, and the test result of the heating panel is indicated as shown in FIG. 8. In FIGS. 7 and 8, reference numerals A and B refer to left and right portions of the heating panel, and a surface temperature and a core temperature at each point of A and B are indicated in FIG. 8. It is identified that the temperature increases up to 70° C. in one minute and increases up to 90° C. in two minutes. Thus, through such an effect, heating may be rapidly provided to the occupants.

In accordance with according to the exemplary embodiment of the present inventive concept, a heating panel for a vehicle is provided in a vehicle interior, and thus, heating may be supplied to occupants through far-infrared radiation.

In particularly, since the heating is performed by radiation instead of contact, it may be possible to provide excellent rapid action and high heating.

In addition, since far-infrared rays are used, it is beneficial to the human body, and high heating may be continuously provided.

In addition, noise is not generated since a blower or the like is not required. Since the heating panel is pressed against and attached to an interior panel, the heating panel may be simply applied without design change of other structures. In addition, it may be possible to remove displeasure due to cold panels which is not resolved in an existing heating system.

While the present disclosure has been described with respect to the exemplary embodiment, it will be apparent to those skilled in the art that various changes and modifications may be made without departing from the spirit and scope of the disclosure as defined in the following claims.

What is claimed is:

1. A heating panel for a vehicle, comprising:
   a heating layer configured to be a plate shape and disposed on one side of the heating panel;
   a heat insulation layer disposed on another side of the heating panel, and
   front and rear insulation layers attached on the front and rear surfaces of the heating layer, respectively,
   wherein the heating panel, installed on a panel provided in an interior space of a vehicle, is spaced apart from an occupant in the interior space of the vehicle, and
   wherein the heat insulation layer is directed toward the panel in the interior space and the heating layer is directed toward the occupant.

2. The heating panel of claim 1, wherein a reflective plate is interposed between the heating layer and the heat insulation layer.

3. The heating panel of claim 1,
   wherein a reflective plate is attached on a rear surface of the rear insulation layer, and the heat insulation layer is attached on a rear surface of the reflective plate.

4. The heating panel of claim 2, wherein the reflective plate is an aluminum panel having a smooth surface and forwardly reflects far-infrared rays emitted from the heating layer.

5. The heating panel of claim 1, further comprising: a radiation cover disposed in front of the front insulation layer and configured to block heat radiation from the heating layer.

6. The heating panel of claim 5, wherein the radiation cover is made of fiber or leather.

7. The heating panel of claim 5, wherein the radiation cover is in black.

8. The heating panel of claim 5, wherein the radiation cover has a net shape and is spaced apart from the front insulation layer, such that an occupant body indirectly contacts the front insulation layer when the occupant press the radiation cover.

9. The heating panel of claim 1, wherein the heating layer is formed of a carbon-nano complex.

10. The heating panel of claim 1, wherein an electrode layer is interposed between the heating layer and the heat insulation layer, and the electrode layer comprises a plurality of anode lines and a plurality of cathode lines traversing the heating layer, and the anode lines and the cathode lines are adjacent to but spaced apart from each other.

11. The heating panel of claim 1, wherein the heating panel is mounted on a surface of a panel disposed beneath a steering wheel or a surface of a front glove compartment cover panel at a passenger seat in the interior space of the vehicle, so that the heating layer is spaced apart from and directed toward a knee of a front occupant.

12. The heating panel of claim 1, wherein the heating panel is mounted on a rear surface of a front seat in the interior space of the vehicle, so that the heating layer is spaced apart from and is directed toward a knee of a rear occupant.

13. The heating panel of claim 1, wherein the heat insulation layer has a thickness equal to or more than 0.5 times an entire thickness of the heating panel.

14. The heating panel of claim 1, wherein the heating layer is controlled in a temperature range of 50 to 100° C.

\* \* \* \* \*